(12) United States Patent
Guo et al.

(10) Patent No.: US 12,728,775 B2
(45) Date of Patent: Sep. 8, 2026

(54) SIDE IMPACT SAFETY PROTECTION DEVICE, CHILD SAFETY SEAT AND BASE

(71) Applicant: WONDERLAND SWITZERLAND AG, Steinhausen (CH)

(72) Inventors: Zhengwen Guo, Steinhausen (CH); Ruyi Li, Steinhausen (CH); Xiaolong Mo, Steinhausen (CH)

(73) Assignee: WONDERLAND SWITZERLAND AG, Steinhausen (CH)

( * ) Notice: Subject to any disclaimer, the term of this patent is extended or adjusted under 35 U.S.C. 154(b) by 297 days.

(21) Appl. No.: 18/555,160

(22) PCT Filed: Apr. 14, 2022

(86) PCT No.: PCT/EP2022/060116

§ 371 (c)(1),
(2) Date: Oct. 12, 2023

(87) PCT Pub. No.: WO2022/219154

PCT Pub. Date: Oct. 20, 2022

(65) Prior Publication Data

US 2024/0198870 A1 Jun. 20, 2024

(30) Foreign Application Priority Data

Apr. 16, 2021 (CN) ......................... 202110413594.9

(51) Int. Cl.
*B60N 2/427* (2006.01)
*B60N 2/28* (2006.01)

(52) U.S. Cl.
CPC ........... *B60N 2/42727* (2013.01); *B60N 2/28* (2013.01); *B60N 2/4279* (2013.01)

(58) Field of Classification Search
CPC ........................... B60N 2/2872; B60N 2/2884; B60N 2/42747; B60N 2/4235; B60N 2/2821
See application file for complete search history.

(56) References Cited

U.S. PATENT DOCUMENTS 10,857,968 B2 * 12/2020 Chen .................... B60N 2/2881
11,198,380 B2 * 12/2021 Guo ..................... B60N 2/2827
(Continued)

FOREIGN PATENT DOCUMENTS

CN 108790970 A 11/2018
CN 109895664 A 6/2019
(Continued)

OTHER PUBLICATIONS

International Search Report issued in corresponding International Application No. PCT/EP2022/060116, dated Jul. 8, 2022, pp. 1-2, European Patent Office, Rijswijk, Netherlands.
(Continued)

*Primary Examiner* — David R Dunn
(74) *Attorney, Agent, or Firm* — HAUPTMAN HAM, LLP

(57) ABSTRACT

A side impact safety protection device, a child safety seat, and a base, wherein the side impact safety protection device includes: a side impact protection block, including a casing and a pivot disposed in the casing; a driving member, for driving the side impact protection block to an unfolded position or a folded position; and a traction member, one end of the traction member is pivotally connected to the side impact protection block, and the other end of the traction member is connected to the driving member. The side impact safety protection device according to the application is simple in structure and easy to operate, and can realize automatically opening and automatic folding of the side impact safety protection device, which makes the operation more convenient.

17 Claims, 10 Drawing Sheets

(56) References Cited

U.S. PATENT DOCUMENTS

| | | | | |
|---|---|---|---|---|
| 2019/0176746 | A1 | 6/2019 | Chen | |
| 2020/0101876 | A1* | 4/2020 | Cui | B60N 2/4235 |
| 2022/0126732 | A1* | 4/2022 | Zhang | B60N 2/4235 |
| 2024/0010106 | A1* | 1/2024 | Mo | B60N 2/2887 |

FOREIGN PATENT DOCUMENTS

| | | | | |
|---|---|---|---|---|
| CN | 110126773 | A | 8/2019 | |
| CN | 111845481 | A | 10/2020 | |
| CN | 112238798 | A | 1/2021 | |
| CN | 109895664 | B | 11/2021 | |
| DE | 102016111608 | A1 | 12/2017 | |
| DE | 202018006242 | U1 | 10/2019 | |
| EP | 3495196 | A1 * | 6/2019 | B60N 2/2821 |
| EP | 3766732 | A1 * | 1/2021 | B60N 2/2821 |
| JP | H04016036 | U | 2/1992 | |
| JP | 2016037282 | A | 3/2016 | |
| JP | 2020183223 | A | 11/2020 | |

OTHER PUBLICATIONS

Taiwan First Office Action issued in corresponding Taiwan Application No. TW111114360, dated Dec. 9, 2022, pp. 1-7.

Taiwan Decision of Rejection issued in corresponding Taiwan Application No. TW111114360, dated May 24, 2023, pp. 1-5.

Notice of Reasons for Refusal issued in Japanese Patent Application No. 2023-562192; date Jul. 16, 2024; 10 pgs.

Search Report issued in Japanese Patent Application No. 2023-562192; date Jul. 17, 2024; 78 pgs.

* cited by examiner

SIDE IMPACT SAFETY PROTECTION DEVICE, CHILD SAFETY SEAT AND BASE

CROSS-REFERENCE TO RELATED APPLICATIONS

This application is a National Stage application of PCT/EP2022/060116; filed on Apr. 14, 2022, which claims the benefit of Chinese Application No. 202110413594.9, filed on Apr. 16, 2021, both of which are incorporated herein by reference in their entirety.

TECHNICAL FIELD

The present disclosure relates to a side impact safety protection device and a child safety seat including the side impact safety protection device. The present disclosure also relates to a base adapted to carry a seating device.

BACKGROUND

A child safety seat is a device specially designed for children of different weights or ages. Children will be restrained in the child safety seats during travelling, so in the case of a car collision or sudden deceleration, the impact on them can be reduced and their bodies can be restricted, thereby effectively improving safety of children in travelling.

SUMMARY

In view of the above problems, a purpose of the application is to provide a side impact safety protection device and a child safety seat comprising the side impact safety protection device, and a base adapted to carry a seating device, wherein the side impact safety protection device is simple in structure and easy to operate, and can realize automatically opening and automatic folding of the side impact safety protection device, which makes the operation more convenient.

For this, according to a solution of the application, a side impact safety protection device is provided which includes: a side impact protection block, including a casing and a pivot disposed in the casing; a driving member, for driving the side impact protection block to an unfolded position or a folded position; and a traction member, one end of the traction member is pivotally connected to the side impact protection block, and the other end of the traction member is connected to the driving member.

According to an embodiment, the side impact safety protection device further includes a resetting member, the resetting member is connected to the driving member, and is used to fold the side impact protection block through the driving member.

According to an embodiment the side impact safety protection device further includes a torsion spring, and the torsion spring is disposed between the side impact protection block and the traction member.

According to an embodiment the torsion spring is sheathed on the pivot of the side impact protection block.

According to an embodiment the side impact safety protection device further comprises a traction member fastener, the traction member fastener is fixedly arranged in the casing of the side impact protection block, and the traction member is connected to the traction member fastener, the pivot of the side impact protection block passes through the traction member fastener.

According to an embodiment the side impact protection block and the traction member fastener are integrally formed.

According to an embodiment the driving member includes a pressing end and a resetting end, the pressing end is exposed to outside, and the resetting end is connected to the resetting member.

According to an embodiment the resetting member is a spring.

According to an embodiment the side impact protection block further includes a rear cover, and the casing and the rear cover are snap-fitted to each other to form a cavity.

According to another solution of the application, a child safety seat is provided, which includes: a body; a base, the body mounted on the base; and the above-mentioned side impact safety protection device is arranged on the base.

According to an embodiment a protection block receiving groove is disposed on a side surface of the base, and the side impact protection block of the side impact safety protection device is accommodated in the protection block receiving groove.

According to an embodiment the pressing end of the driving member of the side impact safety protection device is exposed on an upper surface of the base According to yet another solution of the application, a base adapted to carry a seating device is provided, which includes: a body, having at least one protrusion, and located on at least one of two sides of the body close to its front edge; and the above-mentioned side impact safety protection device, arranged on the at least one protrusion.

According to the side impact safety protection device and the child safety seat including the side impact safety protection device according to the application, the side impact safety protection device is simple in structure and easy to operate, and can automatically open the side impact safety protection device when the body of the child safety seat is placed on the base, so as to provide buffer protection. On the other hand, when the body of the child safety seat is disassembled from the base, the side impact safety protection device can be automatically folded, and the operator does not need to perform a series of cumbersome operations to fold it, which makes the operation more convenient.

BRIEF DESCRIPTION OF THE DRAWINGS

The accompanying drawings are included herein to provide a further understanding of the disclosure, and are incorporated into this specification to constitute a part of this specification. The accompanying drawings illustrate embodiments of the disclosure, and are used together with the following description to illustrate the concept of the disclosure.

In the drawings:

FIG. 4 shows the side impact safety protection device in a folded position, and FIG. 5 shows the side impact safety protection device in an unfolded position;

DETAILED DESCRIPTION

Hereinafter, exemplary embodiments will be described in detail with reference to the accompanying drawings. Although the disclosure is susceptible to various modifications and alternatives, specific embodiments thereof are shown by way of example in the accompanying drawings. However, the disclosure should not be construed as being limited to the embodiments set forth herein, but on the contrary, the disclosure will cover all modifications, equivalents, and alternatives that fall within the spirit and scope of the embodiments.

The present application will be described in detail below mainly with reference to a child safety seat, but the side impact safety protection device according to the application can also be applied to other suitable occasions to provide buffer protection for infants in the child safety seat, and it can realize automatic opening and automatic folding.

In order to improve safety of the child safety seat, some child safety seats in the prior art are provided with side impact safety protection devices, but the side impact safety protection devices mainly provide a buffer protection by means of the elastic force of its elastic member. However, in the event of a side collision of a vehicle, the huge lateral inertial force will cause the elastic member to exceed the elastic limit instantaneously, so the baby in the child safety seat cannot be adequately protected.

In the prior art, there are also some child safety child safety seat provided with side protection airbags. For example, a side protection base is disposed on an outer side of the seat body. The side protection base is provided with an expansible side protection airbag, and correspondingly, the side protection airbag is provided with a vent hole. A resetting structure is arranged in the side protection airbag, furthermore, an outer end of the side protection airbag is provided with a side protection cover, and the side protection cover and the side protection base are locked with each other for accommodating the side protection airbag. However, the side impact protection device with this structure has problems of complex structure, high cost and complex installation, moreover, the users cannot voluntarily choose to turn on or off the side impact protection device.

Furthermore, the side impact protection devices of the child safety seats in the prior art cannot be automatically folded, and require the user to perform a series of operations in order to fold the side impact protection device when the side impact protection device is not in use, which causes inconvenience in use.

A side impact safety protection device 30 and a child safety seat 1 including the side impact safety protection device 30 according to the application will be described in detail below with reference to the accompanying drawings.

Figure 1:
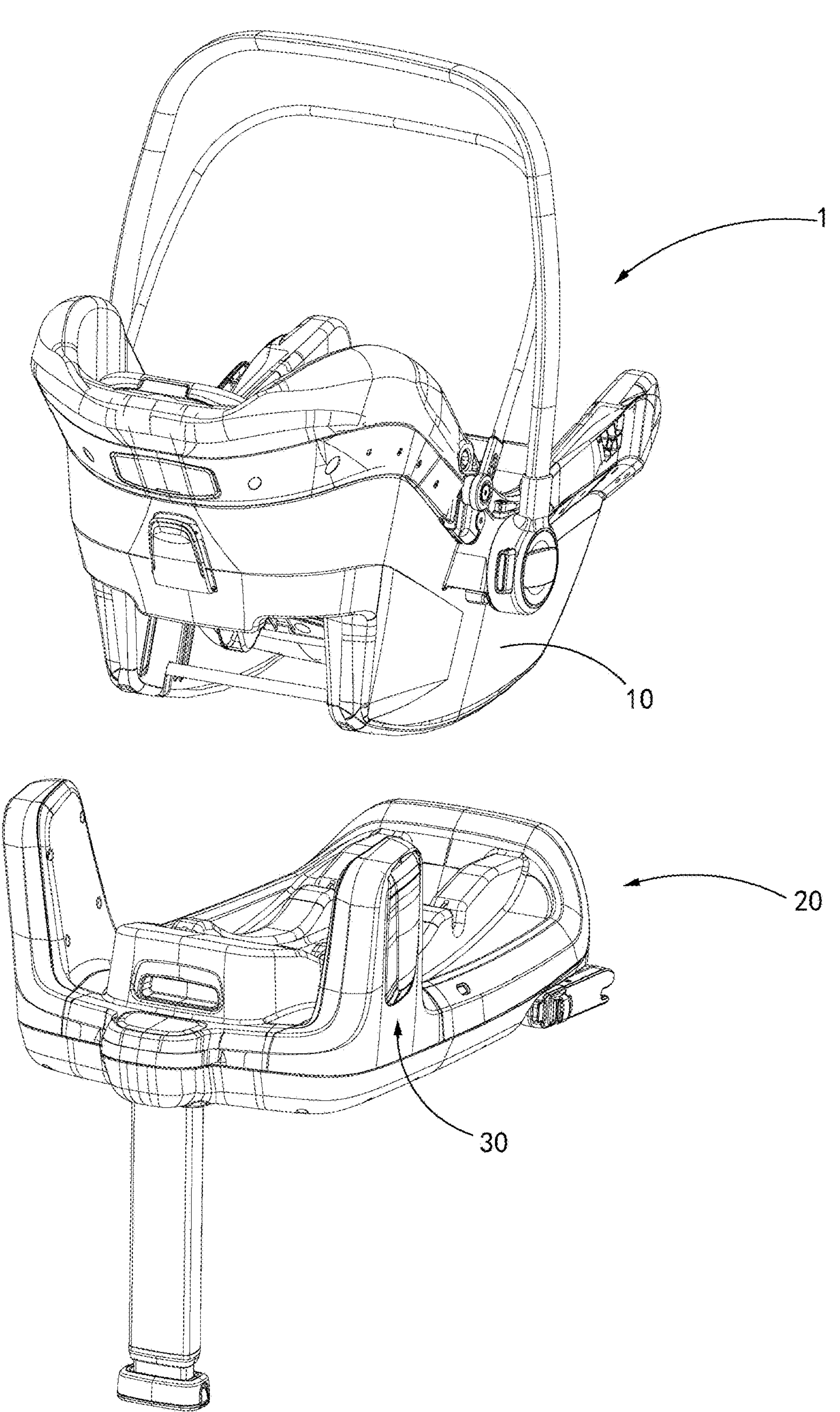
FIGS. 1 and 2 are schematic views showing a structure of a child safety seat according to the application, among them, the child safety seat is not placed on a base in FIG. 1, and the child safety seat is placed on the base in FIG. 2.
Figure 2:
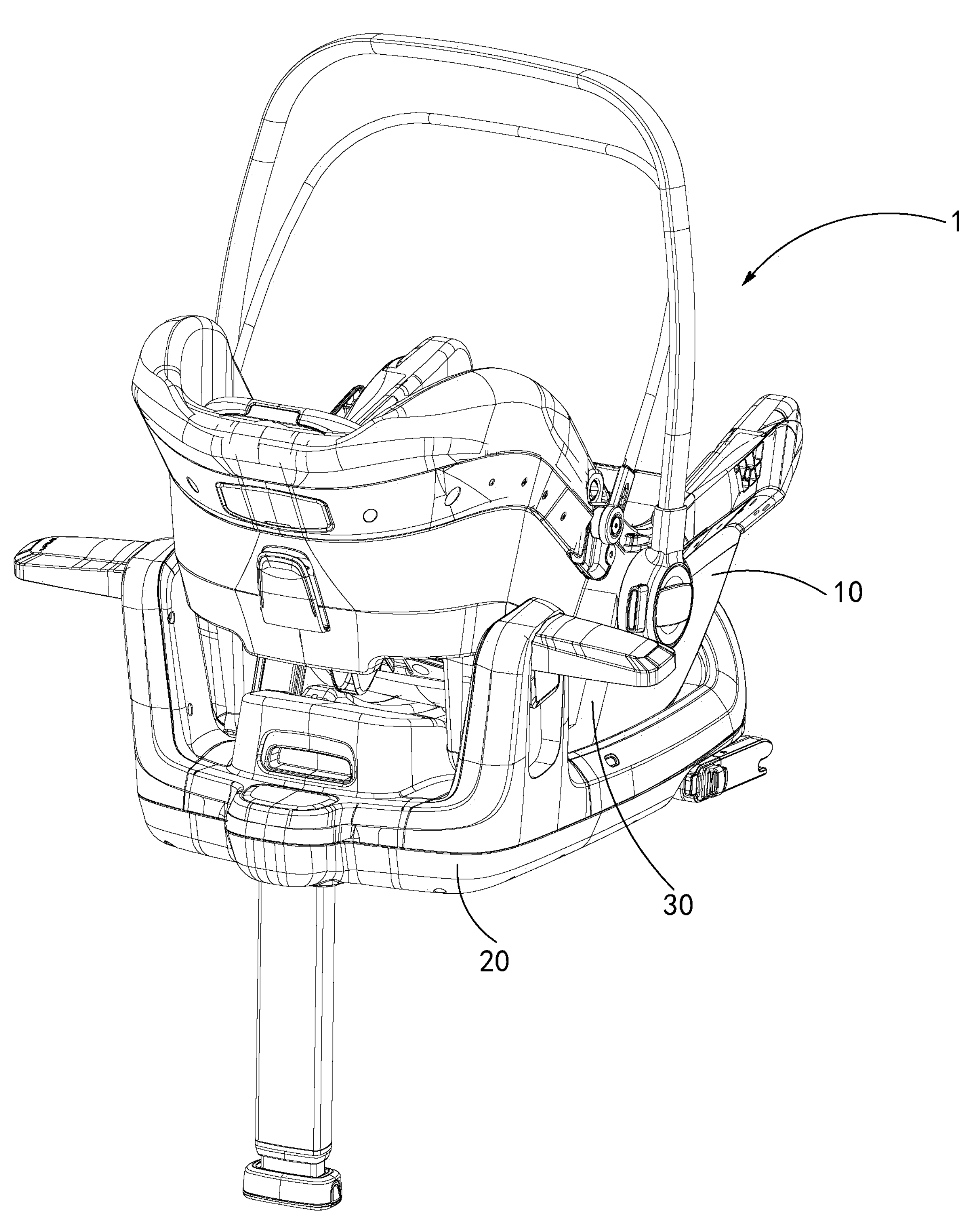

As shown in FIGS. 1 and 2, which are schematic views showing a structure of the child safety seat 1 according to the application, among them, the child safety seat 1 is not placed on a base 20 in FIG. 1, and the child safety seat 1 is placed on the base 20 in FIG. 2. Specifically, the child safety seat 1 include a body 10 and a base 20, as well as a side impact safety protection device 30 according to the application. The side impact safety protection device 30 is arranged on the base 20. When the body 10 of the child safety seat 1 is not placed on the base 20, as shown in FIG. 1, the side impact safety protection device 30 is in a folded state. Moreover, when the body 10 of the child safety seat 1 is placed on the base 20, as shown in FIG. 2, the side impact safety protection device 30 arranged on the base 20 will automatically protrude outward to an unfolded position to provide a buffer protection function.

Figure 3:
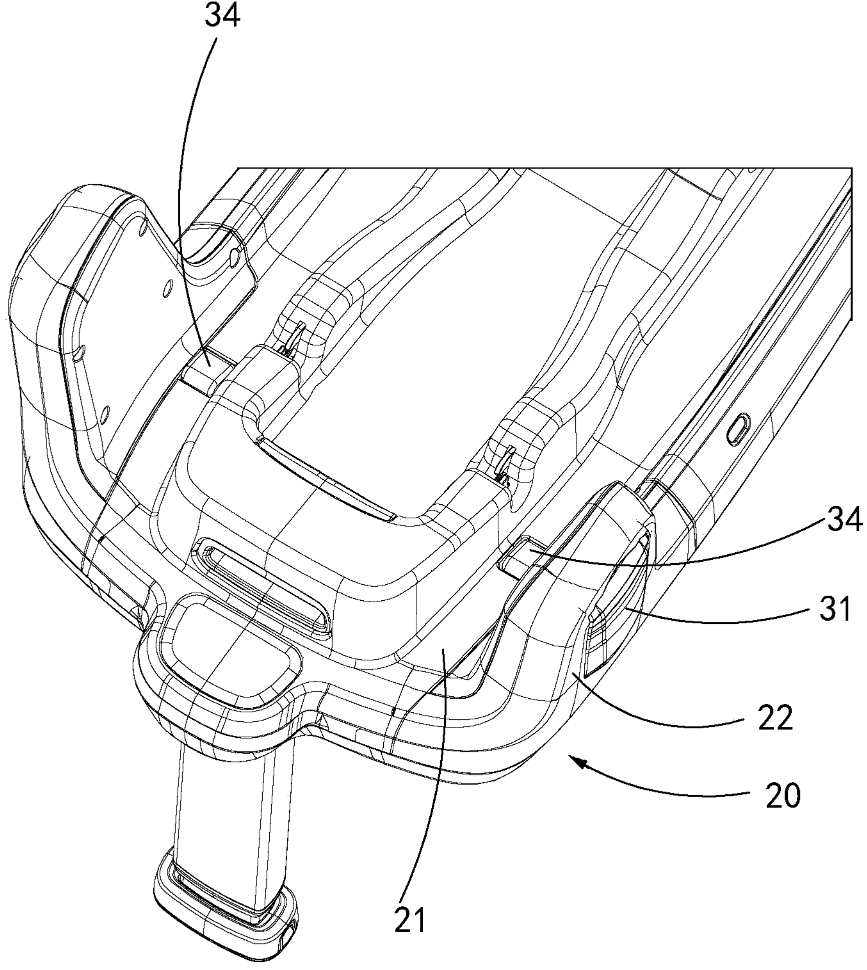
FIG. 3 is a schematic view showing a structure of the base according to the application.

Referring to FIG. 3 additionally, which is a schematic view showing a structure of the base 20 according to the application. The base 20 includes an upper surface 21 and a side surface 22. During the use of the child safety seat 1, the base 20 is fixedly installed on a seat of a car, and the body 10 of the child safety seat 1 is embedded on the base 20. The side impact safety protection device 30 according to the application includes a side impact protection block 31 and a driving member 34 for driving the side impact protection block 31. The driving member 34 of the side impact safety protection device 30 can be seen from the upper surface 21 of the base 20 shown in FIG. 3, and the side impact protection block 31 of the side impact safety protection device 30 can be seen from the side surface 22 of the base 20.

Figure 4:
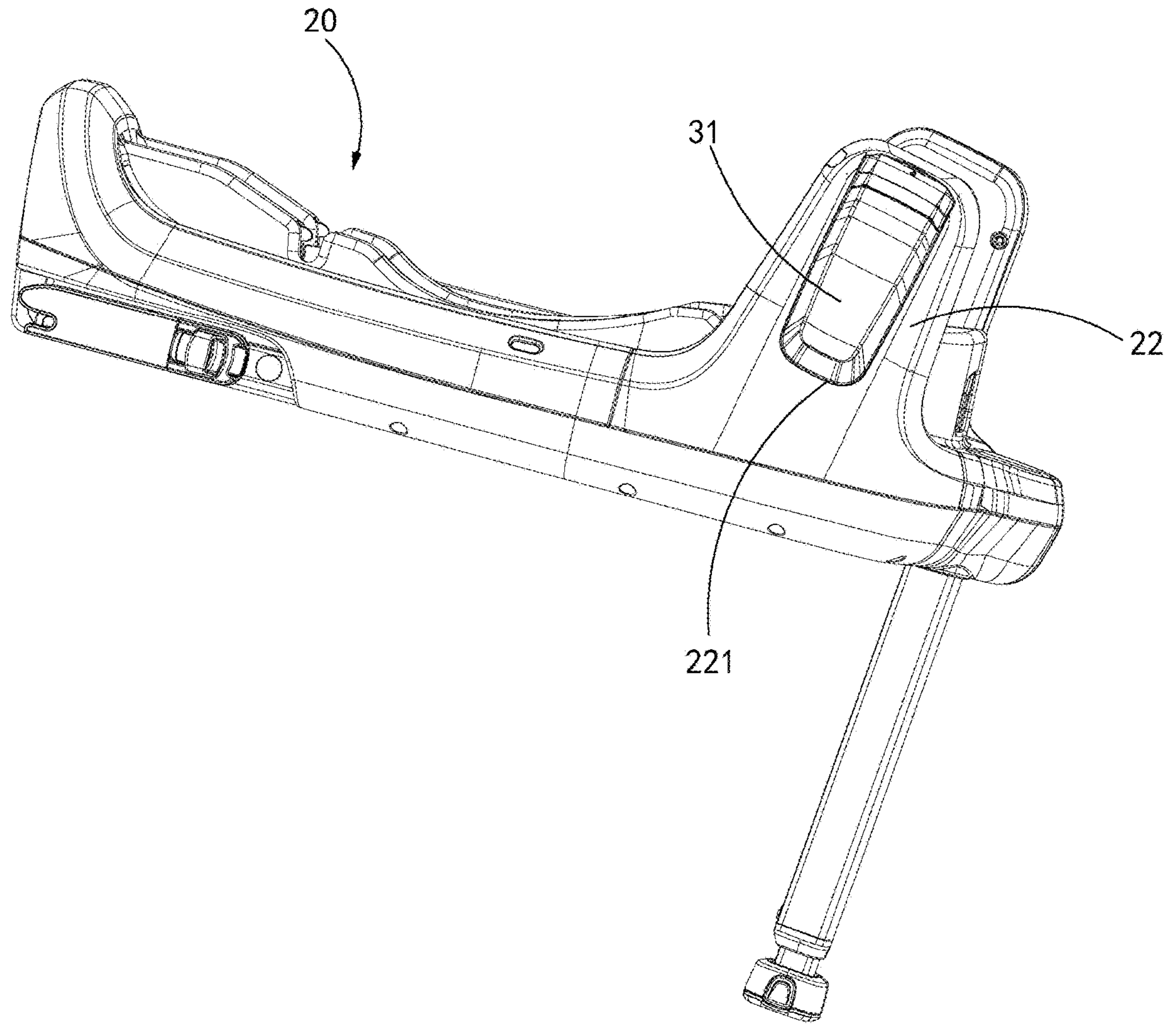
FIGS. 4 and 5 are schematic views showing a structure of a side impact safety protection device according to the application, among them.
Figure 5:
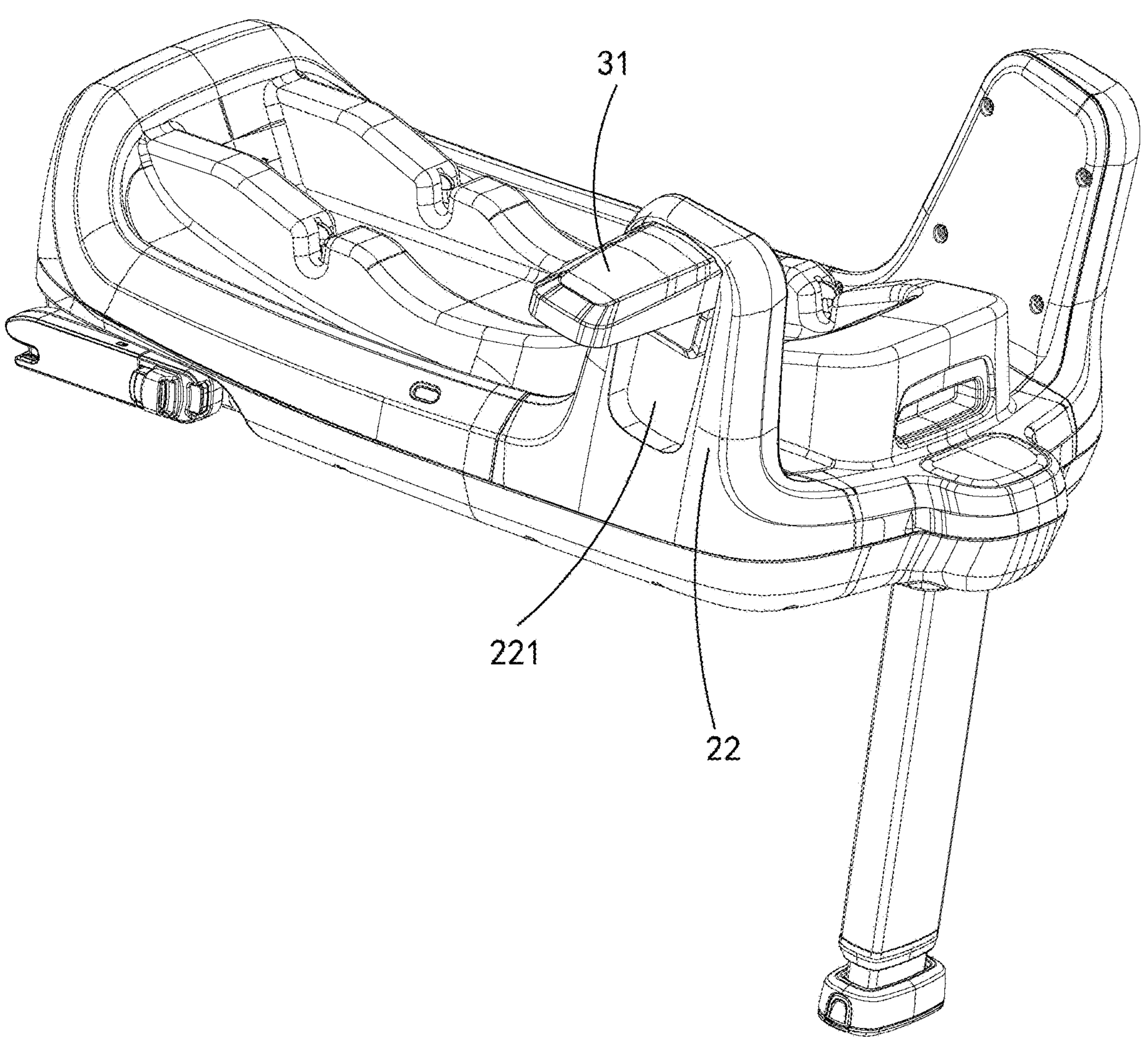

Referring to FIGS. 4 and 5, among them, FIG. 4 shows the side impact protection block 31 of the side impact safety protection device 30 in the folded position, and FIG. 5 shows the side impact protection block 31 of the side impact safety protection device 30 in the unfolded position. Preferably, a protection block receiving groove 221 is disposed on the side surface 22 of the base 20, and the side impact protection block 31 of the side impact safety protection device is received in the protection block receiving groove 221 when the side impact safety protection device is in its folded state, so as to further accommodate the side impact protection block 31 and reduce the overall size of the folded volume.

Figure 6:
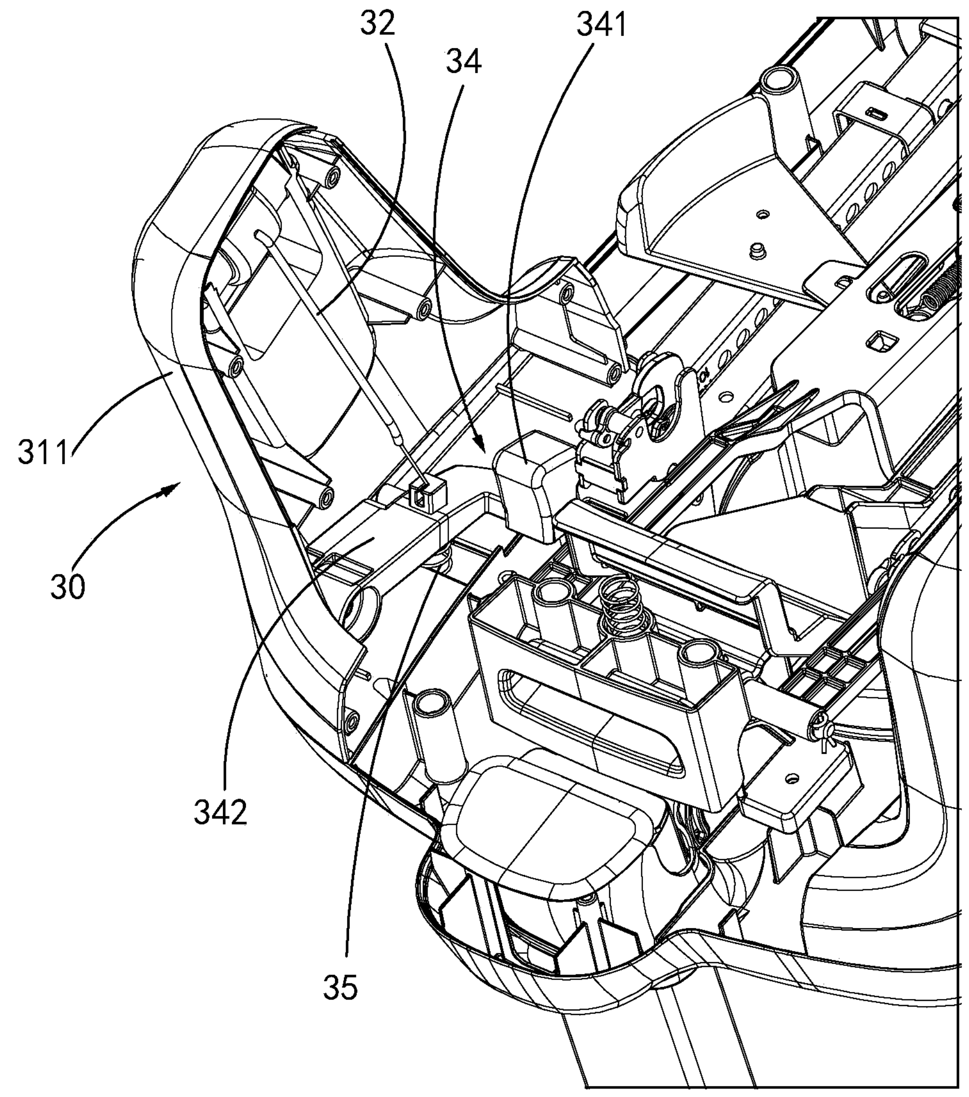
FIG. 6 is a schematic view showing a specific structure of the side impact safety protection device according to the application.
Figure 7:
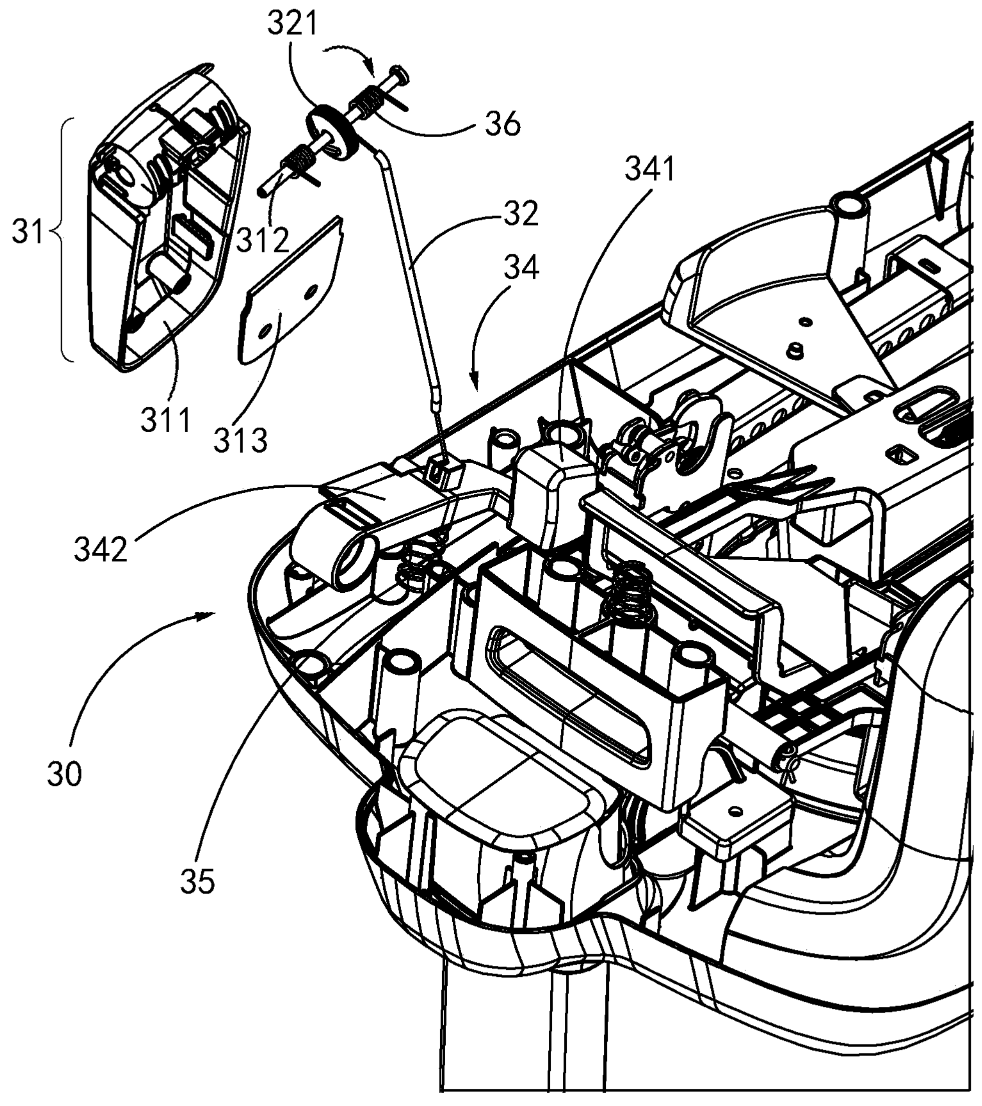
FIG. 7 is another schematic view showing the specific structure of the side impact safety protection device according to the application.

The specific structure of the side impact safety protection device 30 according to the application will be described in detail below by referring to FIGS. 6 and 7. Among them, FIG. 6 is a schematic view showing the specific structure of the side impact safety protection device 30 according to the application, and FIG. 7 is another schematic view showing the specific structure of the side impact safety protection device 30 according to the application. The side impact safety protection device 30 according to the application mainly includes: a side impact protection block 31, a traction member 32, a driving member 34, and a resetting member 35, wherein the driving member 34 is used to drive the side impact protection block 31 to be in the unfolded position or the folded position; one end of the traction member 32 is connected to the side impact protection block 31, and the other end of the traction member 32 is connected to the driving member 34; wherein the resetting member 35 is connected to the driving member 34, so as to fold the side impact protection block 31 through the driving member 34.

Figure 8:
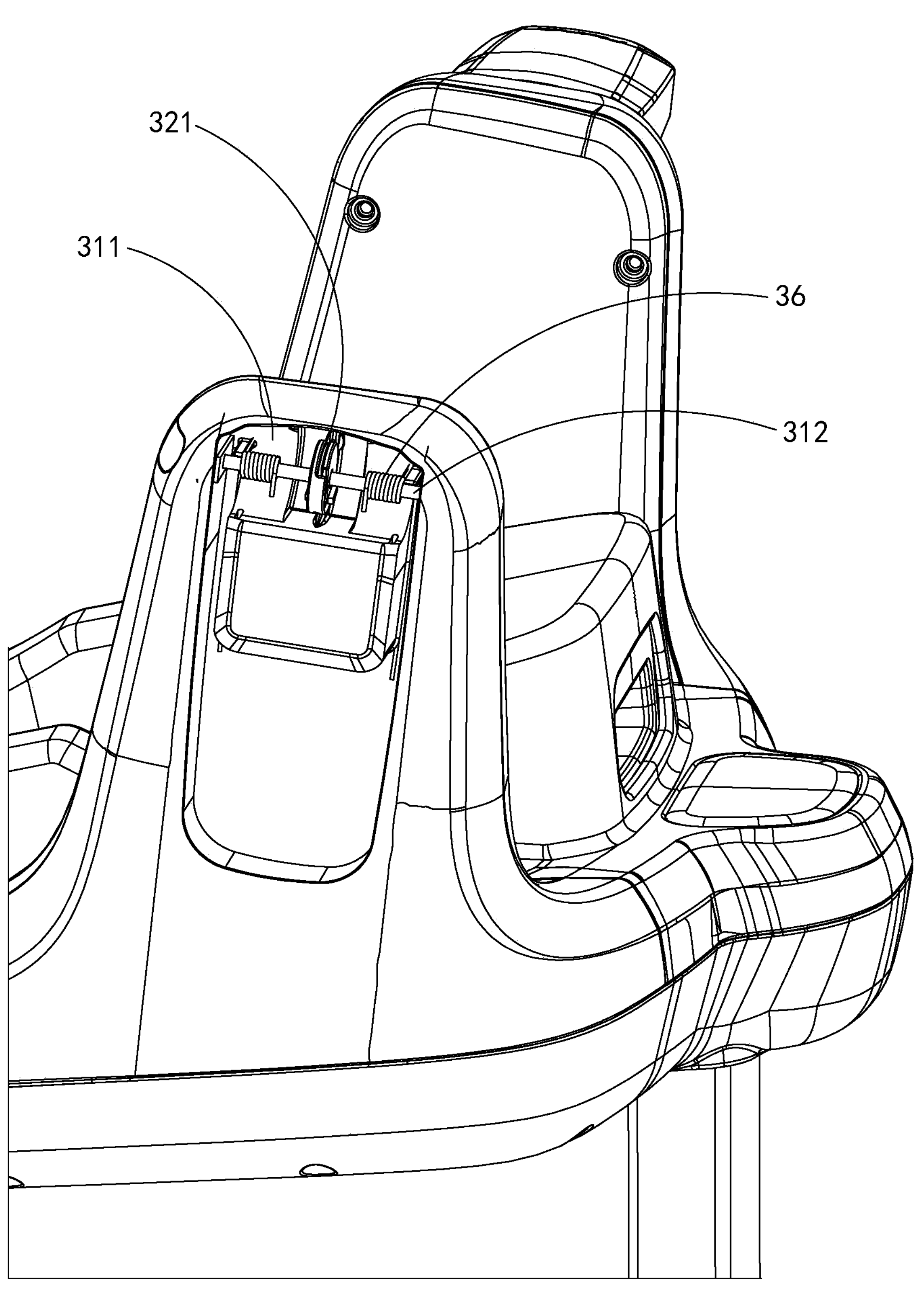
FIG. 8 is a schematic view showing a specific structure of a side impact protection block of the side impact safety protection device according to the application.

Specifically, based on the preferred embodiment shown in FIGS. 6 and 7, as previously described, the side impact protection block 31 in folded position is located in the protection block receiving groove 221 on the side surface 22 of the base 20, and the side impact protection block 31 further includes a casing 311, a pivot 312, and a rear cover 313. The casing 311 and the rear cover 313 are snap-fitted to each other, so as to enhance an overall aesthetics of the side impact protection block 31. Furthermore, the casing 311 and the rear cover 313 together form a cavity for accommodating components and structure therein. Of course, in other embodiments, the side impact protection block 31 may also be an integrally formed structure. The pivot 312 is arranged in the casing 311 of the side impact protection block 31. One end of the traction member 32 is connected to the pivot 312 of the side impact protection block 31. According to the shown preferred embodiment, the side impact safety protection device 30 further includes a torsion spring 36, and the torsion spring 36 is sheathed on the pivot 312. Specifically, as shown in FIG. 8, which shows the specific structure of the side impact protection block 31, and in order to clearly show the structures of the torsion spring 36 and the pivot 312, etc., the rear cover 313 is removed in this figure. The side impact safety protection device 30 preferably further includes a traction member fastener 321. The traction member fastener 321 is fixedly arranged in the casing 311 of the side impact protection block 31, and the traction member 32 is connected to the traction member fastener 321. In addition, the pivot 312 of the side impact protection block 31 passes through the traction member fastener 321, and as preferably shown, two torsion springs 36 are respectively arranged on parts of the pivot 312 located on both sides of the traction member fastener 321. In this way, the side impact protection block 31 is pivotally connected to the traction member 32 through the traction member fastener 321. Furthermore, one end of each of the torsion springs 36 is connected to or abutted against the side impact protection block 31, and the other end of each of the torsion springs 36 is abutted against the protection block receiving groove 221. The torsion springs 36 normally push the side impact protection block 31 to the folded position. According to another preferred embodiment, the side impact protection block 31 and the traction member fastener 321 are integrally formed.

As mentioned above, one end of the traction member 32 is connected to the side impact protection block 31, and the other end of the traction member 32 is connected to the driving member 34. The driving member 34 preferably includes a pressing end 341 and a resetting end 342. The pressing end 341 is exposed outside the upper surface 21 of the base 20, such that the body 10 of the child safety seat 1 contacts with the pressing end 341 of the driving member 34, thus triggering the driving member 34. The resetting end 342 of the driving member 34 is connected to the resetting member 35. According to the preferred embodiment shown in FIGS. 6 and 7, the resetting member 35 is a spring.

Figure 9:
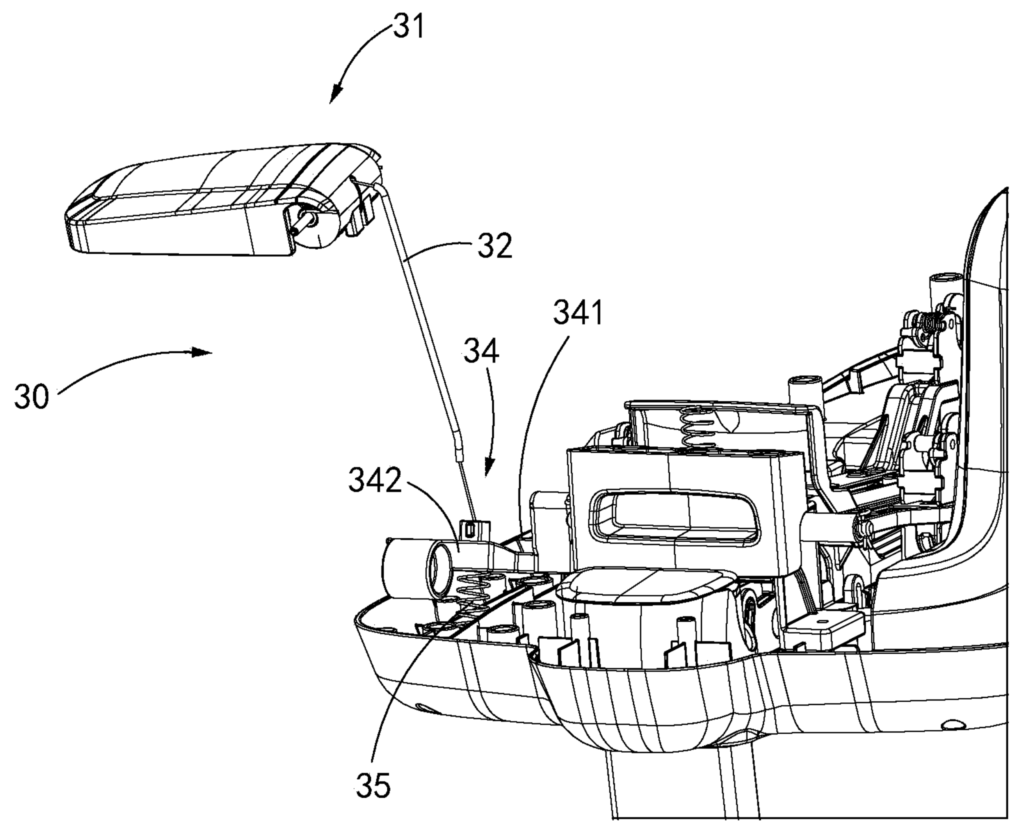
FIGS. 9 and 10 are schematic views showing the structure of the side impact safety protection device according to the application in different positions.
Figure 10:
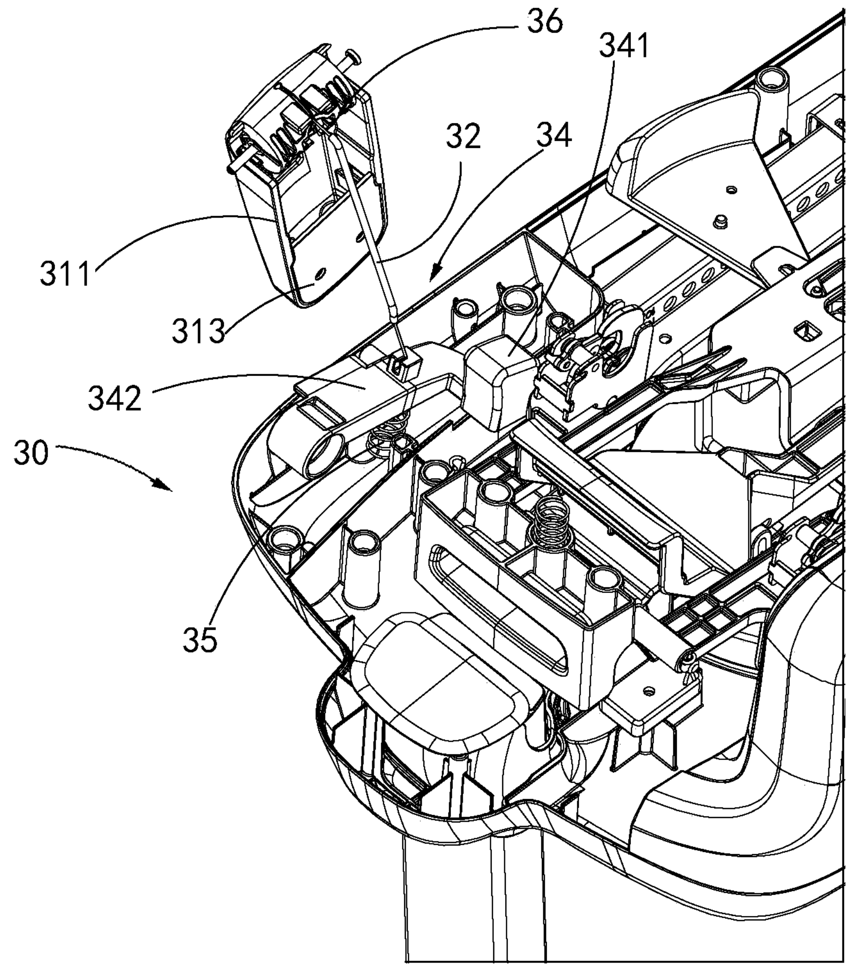

Next, the detailed action process of the side impact safety protection device 30 according to the application will be described by referring to FIGS. 9 and 10, wherein FIGS. 9 and 10 are schematic views showing the structure of the side impact safety protection device 30 according to the application in different positions.

At the same time, referring to FIG. 7, when the body 10 of the child safety seat 1 is placed on the base 20, the body 10 will touch the pressing end 342 of the driving member 34 exposed outside the upper surface 21 of the base 20, and will press down the pressing end 342 based on the gravity of the body 10 itself, so that the traction member 32 will be pulled downward, thereby driving the traction member fastener 321 to rotate in the clockwise direction indicated by the arrow in FIG. 7. Under the driving of the traction member fastener 321, the side impact protection block 31 is pivoted outward against the pushing action of the torsion springs 36, and thusly is in its unfolded position to provide buffer protection.

When the side impact protection block 31 is in the unfolded position, the resetting member 35 is compressed. On the other hand, as shown in FIG. 9, when the body 10 of the child safety seat 1 is disassembled from the base 20, the pressure of the gravity of the body 10 its own on the pressing end 341 of the driving member 34 disappears. At this time, the traction member 32 will move upward under the action of the elastic force of the resetting member 35, meanwhile, the torsion springs 36 arranged between the side impact protection block 31 and the traction member 32 are released, such that under the action of the torsion springs 36, the side impact protection block 31 is pivoted downward to its folded position.

For the side impact safety protection device 30 according to the application and the child safety seat 1 including the side impact safety protection device 30, the side impact safety protection device 30 is simple in structure and easy to operate, and can automatically deploy the side impact protection block 31 of the side impact safety protection device 30 in its unfolded position when the body 10 of the child safety seat 1 is placed on the base 20, so as to provide buffer protection. On the other hand, when the body 10 of the child safety seat is disassembled from the base 20, the side impact protection block 31 of the side impact safety protection device 30 can be automatically folded under driving of the resetting member 35, and the operator does not need to perform a series of cumbersome operations to fold it, which makes the operation more convenient.

In the above description about embodiments of the application, the child safety seat is used as an example for illustration. However, the application may also be other types of seating devices in suitable forms. The application also relates to a base suitable for carrying a seating device. The base includes, for example, a body with at least one protrusion located on at least one of two sides of the body close to its front edge, the side impact safety protection device described above is arranged on the protrusion.

Since the features of the disclosure can be embodied in various forms without departing from the characteristics of the disclosure, it should also be understood, the above embodiments are not limited to any details described above, unless otherwise noted; rather, it should be interpreted broadly as being within the scope defined by the appended claims. Therefore, all modifications and variations falling within the scope and limits of the claims or equivalent solutions of such scope and limits shall be covered by the appended claims.

LIST OF REFERENCE SIGNS

1: child safety seat
10: body
20: base
21: upper surface
22: side surface
221: protection block receiving groove
30: side impact safety protection device
31: side impact protection block
311: casing
312: pivot
313: rear cover
32: traction member
321: traction member fastener
34: driving member
341: pressing end
342: resetting end
35: resetting member
36: torsion spring

What is claimed is:

1. A side impact safety protection device, comprising:

a side impact protection block, including a casing and a pivot disposed in the casing;

a driving member, for driving the side impact protection block to an unfolded position or a folded position;

a traction member fastener; and a traction member, wherein one end of the traction member is connected to the pivot of the side impact protection block by way of the traction member fastener, and the other end of the traction member is connected to the driving member, wherein the traction member is configured to drive the traction member fastener to rotate to cause the side impact protection block to switch from the folded position to the unfolded position.

2. The side impact safety protection device according to claim 1, wherein the side impact safety protection device further comprises a resetting member, wherein the resetting member is connected to the driving member, and is used to fold the side impact protection block through the driving member.

3. The side impact safety protection device according to claim 1, wherein the side impact safety protection device further comprises a torsion spring, and the torsion spring is disposed between the side impact protection block and the traction member.

4. The side impact safety protection device according to claim 3, wherein the torsion spring is sheathed on the pivot of the side impact protection block.

5. The side impact safety protection device according to claim 1, wherein the traction member fastener is fixedly arranged in the casing of the side impact protection block, and wherein the pivot of the side impact protection block passes through the traction member fastener.

6. The side impact safety protection device according to claim 5, wherein the side impact protection block and the traction member fastener are integrally formed.

7. The side impact safety protection device according to claim 2, wherein the driving member comprises a pressing end and a resetting end, the pressing end is exposed to outside, and the resetting end is connected to the resetting member.

8. The side impact safety protection device according to claim 2, wherein the resetting member is a spring.

9. The side impact safety protection device according to claim 1, wherein the side impact protection block further comprises a rear cover, and the casing and the rear cover are snap-fitted to each other to form a cavity.

10. A child safety seat, comprising:

a body;

a base, on which the body is mounted; and the side impact safety protection device according to claim 1, arranged on the base.

11. The child safety seat according to claim 10, wherein a protection block receiving groove is disposed on a side surface of the base, and the side impact protection block of the side impact safety protection device is capable of being accommodated in the protection block receiving groove.

12. The child safety seat according to claim 10, wherein a pressing end of the driving member of the side impact safety protection device is exposed outside an upper surface of the base.

13. A base adapted to carry a seating device, comprising:

a body, having at least one protrusion located on at least one of two sides of the body close to its front edge; and the side impact safety protection device according to claim 1, arranged on the at least one protrusion.

14. The side impact safety protection device according to claim 2, wherein the side impact safety protection device further comprises a torsion spring, and the torsion spring is disposed between the side impact protection block and the traction member.

15. The side impact safety protection device according to claim 14, wherein the torsion spring is sheathed on the pivot of the side impact protection block.

16. The child safety seat according to claim 11, wherein a pressing end of the driving member of the side impact safety protection device is exposed outside an upper surface of the base.

17. A side impact safety protection device, comprising:

a side impact protection block, including a casing and a pivot disposed in the casing;

a driving member, for driving the side impact protection block to an unfolded position or a folded position;

a traction member, wherein one end of the traction member is connected to the pivot of the side impact protection block, and the other end of the traction member is connected to the driving member; and a torsion spring which pushes the side impact protection block towards a direction of the folded position, wherein in response to the driving member not being triggered, the torsion spring pushes the side impact protection block to the folded position, and in response to the driving member being triggered, the driving member drives the side impact protection block to switch from the folded position to the unfolded position.

* * * * *